United States Patent
Edwards et al.

(10) Patent No.: US 11,599,864 B2
(45) Date of Patent: Mar. 7, 2023

(54) CONTEXTUAL SELF-CHECKOUT BASED VERIFICATION

(71) Applicant: NCR Corporation, Atlanta, GA (US)

(72) Inventors: Thomas Edwards, Suwanee, GA (US); John C Allard, Hobe Sound, FL (US)

(73) Assignee: NCR Corporation, Atlanta, GA (US)

( * ) Notice: Subject to any disclaimer, the term of this patent is extended or adjusted under 35 U.S.C. 154(b) by 1000 days.

(21) Appl. No.: 16/295,544

(22) Filed: Mar. 7, 2019

(65) Prior Publication Data
US 2020/0286058 A1    Sep. 10, 2020

(51) Int. Cl.
*G06Q 20/18* (2012.01)
*G06V 20/52* (2022.01)
*G06V 10/70* (2022.01)
*G06T 7/20* (2017.01)

(52) U.S. Cl.
CPC ......... *G06Q 20/18* (2013.01); *G06T 7/20* (2013.01); *G06V 10/768* (2022.01); *G06V 20/52* (2022.01); *G06T 2207/30196* (2013.01); *G06T 2207/30232* (2013.01); *G06T 2207/30242* (2013.01)

(58) Field of Classification Search
CPC ......... G06Q 20/18; G06Q 20/208; G06Q 20/40145; G06T 7/20; G06T 2207/30196; G06T 2207/30232; G06T 2207/30242; G06V 10/768; G06V 20/52; G07G 1/0072
See application file for complete search history.

(56) References Cited

U.S. PATENT DOCUMENTS

| | | | |
|---|---|---|---|
| 2009/0039164 A1* | 2/2009 | Herwig | G07G 1/14 235/462.41 |
| 2017/0103266 A1* | 4/2017 | Migdal | G08B 13/19691 |
| 2018/0075424 A1* | 3/2018 | Gotanda | G06Q 20/20 |
| 2018/0253708 A1* | 9/2018 | Mohanakrishnan | G06Q 30/06 |
| 2019/0311346 A1* | 10/2019 | Costello | G06Q 20/4016 |

\* cited by examiner

*Primary Examiner* — Paul Danneman
(74) *Attorney, Agent, or Firm* — Schwegman, Lundberg & Woessner (57) ABSTRACT

A transaction is detected on a terminal. A context for an association of items, bags, shelving, carts, and individuals present during the transaction is maintained from images captured during the transaction. Rules are processed to determine actions to process during the transaction and/or after the transaction based on reported transaction details, the context, and analytics derived from the images for the context. In an embodiment, at least one rule identifies an action that overrides an attendant intervention at the terminal, which would have been issued for a detected weight discrepancy by a scale of the terminal.

20 Claims, 4 Drawing Sheets

CONTEXTUAL SELF-CHECKOUT BASED VERIFICATION

BACKGROUND

Increasingly, consumers are using Self-Service Terminals (SSTs) to perform self-checkouts at retail outlets. This allows the retailer to more effectively utilize staff for other purposes besides checking consumers out of the stores. Consumers enjoy the convenience of self-checkouts and the reduced amount of time that it takes to checkout by avoiding long cashier-assisted checkout queues.

To avoid consumer theft, which is extremely costly to low margin retailers (such as grocery stores), the retailers have a variety of security measures deployed at the SSTs. The retailers also retain at least one assistant to assist consumers when needed during self-checkouts.

However, there are far too many situations where false positive security events are raised by the SSTs that require attendant intervention, which detract from a consumer's expectation of convenience and reduced checkout time.

For example, a consumer's child may be placing items on the bag scale and removing items. A particularly large item may not be fully situated on the produce scale (half of the item is resting on the counter so as to not detect its full weight). A consumer may remove bags from one side of the counter or from the cart and place on the bagging scale in an effort to organize the bags before leaving. A consumer may be re-shuffling items from one bag to a different bag. A consumer may hold back some scanned items to scan another heavier item, which the consumer then puts in the bag followed by the held back items for purposes of organizing the bag.

Another issue that is problematic for false positive attendant-assistance calls is associated with low weight items. Typically, as an item code is scanned or inputted into the SST, the consumer is instructed to place the item in the bag and the bag/bag rack sits on a bag scale. The scanned item includes an item code and the item code is linked to a known average weight for the item. The bag scale also has a tolerance below which the scale may not return any weight. The average weight of any given item is dynamically averaged, such that consumers that scan one low weight item and stick multiple low weight items in the bag can change the average weight of that item for a next consumer that buys that item, which can result in attendant calls for each subsequent consumer buying that item.

SUMMARY

In various embodiments, methods and a system for contextual self-checkout based verification are presented.

According to an embodiment, a method for contextual self-checkout based verification is presented. Specifically, and in one embodiment, a transaction is monitored from images captured of a checkout area. A context is derived for the transaction from the images. The context is compared to a transaction state being processed independently for the transaction at a transaction terminal within the checkout area. An action is identified from a rule and processed based on the comparison of the transaction state to the context.

DETAILED DESCRIPTION

Figure 1:
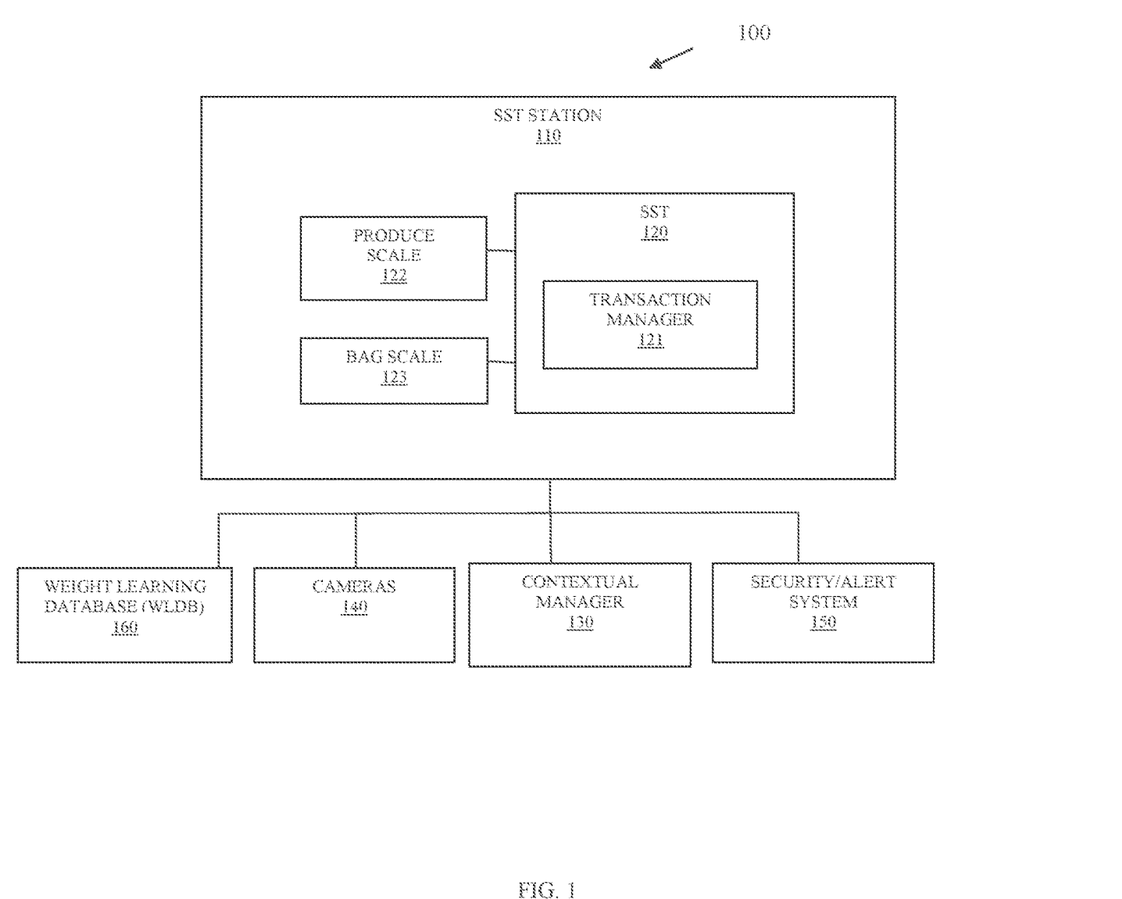
FIG. 1 is a diagram of a system for contextual self-checkout based verification, according to an example embodiment.

FIG. 1 is a diagram of a system 100 for contextual self-checkout based verification, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of contextual self-checkout based verification presented herein and below.

The system 100 includes a SST station 110. The SST station 120 includes a SST 120 having a transaction manager 121, a produce scale 122, and a bag scale 123. The system 100 further includes a contextual manager 130, one or more cameras 140, a security/alert system 150, and weight-learning database (WLDB) 160.

The transaction manager 121 is implemented as executable instructions that reside in a non-transitory computer-readable storage medium and are executed by a processor of the SST 120.

The contextual manager 130 is implemented as executable instructions that reside in a non-transitory computer-readable storage medium and are executed by a processor of a server. In an embodiment, the contextual manager 130 resides on and is executed by a processor of the SST 120.

The security/alert system 150 includes one or more services that are implemented as executable instructions and executed from a non-transitory computer-readable storage medium by one or more processors of one or more servers.

The WLDB 160 includes one or more services that are implemented as executable instructions and executed from a non-transitory computer-readable storage medium by one or more processors of one or more servers.

The SST station 110 includes a variety of structures and devices for which a consumer (may also be referred to herein as "user," "customer," or "operator of the SST 120") performs a self-checkout for items being purchased at a retailer. It is noted that the SST 120 may include a variety of other peripheral-based devices, such as a touchscreen display, a barcode scanner, a camera, and integrated scanner/camera, a currency acceptor, a currency dispenser, a card reader, and a receipt printer.

As an item in a transaction is inputted (through item barcode scanning or touchscreen entry of an item code), the transaction manager 121 obtains the item information including item pricing and expected item average weight from the WLDB 160.

Weights for produce are weighed by the produce scale 122 and as each item is placed in bags, a weight of the item is provided by the bag scale 123. The transaction manager 121 manages the weights against what is expected for the item from the average item weights provided from the WLDB 160 within configured tolerances.

Concurrently, images of the consumer operating the SST 120 are captured by the cameras 140. If discrepancies in item weights are noted by the transaction manager for weights provided by either the produce scale 122 or the bag scale 123, the transaction manager 121 raises an alert; but rather than alerting an attendant to assist the consumer with the transaction, the transaction manager 121 provides the alert to the contextual manager 130.

The contextual manager 130 tracks item movement within the SST station as the transaction progresses with the transaction, such that the location of any given item is known by the contextual manager 130 when the discrepancy alert is raised by the transaction manager 121. The contextual manager 130 uses metadata templates for rapidly identifying specific items based on the items' known pixel attributes (shape, color, edges, dimensions, etc.). Moreover, the location of the bag scale 123, the produce scale 122, a consumer cart, if any, existing bags in use by the consumer, and any individuals with the consumer at the SST station 110 are identified from the images. Such that at any given point in time the contextual manager 130 knows where an item is located (such as in a particular bag, in a bag that is located in the cart, on the bag rack, on top of an SST station counter, on the floor, being held by another individual other than the consumer, etc.).

The context manager 130 can provide a context with respect to each item that is being processed by the transaction manager 121. It is noted that if an image shows the item being placed in a bag and subsequent image shows the bag being placed in the cart, then the last-known or expected location for the item is in a bag within the cart. That is, any given image may have an obscured or no image detail at all for a given item but the last known location is known and is tracked by the contextual manager 130, such that when the transaction manager 121 raises an alert event, the context of the item that is associated with the item is known.

The alert raised by the transaction manager 121 can then be cleared based on the resolved context by the contextual manager 130. This avoids the transaction manager 121 suspending the transaction and requesting an attendant's assistance (avoids a false positive).

For example, a consumer may have removed an item from a bag on the bag scale when scanning a next item and placed the removed item in a bag that is already in the cart. The transaction manager 121 raises an alert because the bag scale 123 was expecting an increase in weight that accounted for both removed item and then newly scanned item. The contextual manager 130 identifies the removed item as being in the cart and instructs the transaction manager to clear the alert and continue with transaction processing.

In an embodiment, the contextual manager 130 may identify the removed item to the transaction manager 121, and the transaction manager removes the recorded weight for the removed item from what it expects to see from the bag scale 123 when checking for the weight with the newly scanned item added. Thus, the contextual manager 130 may just instruct the transaction manager 121 to override the alert or may provide the transaction manager 121 with enough detail to correct the weights being checked to account for a given situation taken by the consumer, such that weights can continue to be monitored with corrected weight information.

In an embodiment, the contextual manager 130 may proactively identify a potential situation during the transaction to the transaction manager 121, such as when a produce item being weighed by the produce scale 122 was partially resting on the adjacent shelf surface and was not completely placed on the produce scale surface. The transaction manager 121 receives the notifications and displays a message to the consumer to reweigh the produce item and ensure the item is centered on the produce scale 122 without resting on the adjacent surface.

The contextual manager 130 also provides video analytics for the activity depicted in the images, such as a total of 5 items were tracked, all 5 items are in a bag, in possession of the consumer, in a consumer bag, or in a cart of the consumer. If the transaction manager 121 is showing 4 items scanned and the images depict the consumer moving in the direction of an exit, the contextual manager 130 can send a notification to the security/alert system 150, turn on security lights, instruct the transaction manager to illuminate a sound or light, etc.

The video analytics can also be used to detect when the consumer leaves the cart and all the items at the SST station 110 and exits the store without paying. Here, there can be a variety of reasons why this may have occurred, such as the consumer forgot they did not bring a payment means with them to pay for the items and is simply electing to leave the store. In such a situation, no security alert is raised, but the contextual manager 130 may send a notification to other store personnel to come and restock the items present at the SST station 110. Another case may be when the consumer leaves the items to go to a service desk for assistance. The video analytics can identify that the consumer is leaving the SST station 110 but not with any of the items, such that no security situation is needed.

The video analytics can also provide the context when a consumer leaves behind an item or a consumer bag (purse) at the SST station 110. The number of items purchased based on the transaction manager's processing indicates more than what the consumer is leaving the store with. Here, an alert can be raised on the SST 120 or at an egress point, to remind the consumer or to get the attention of the consumer to return for the missed item or bag.

In this way, the contextual manager 130 can compare the video analytics for the transaction as determined from the images against transaction item details produced by the transaction manager 121 for the transaction. Rules are used to determine the processing actions of the contextual manager 130 based on the comparison, such as: 1) a rule that is the total items detected in the images exceed the total items of the transaction raise a security alert to the security/alert system 150; 2) a rule that if the total items in the images is less than the transacted item raise alerts to get the attention of staff and/or the consumer before exiting the store; 3) a rule that if the consumer leaves all the items at the station 110 cancel the transaction and alert personnel to restock the items when the consumer is detected in the images as leaving the store; 4) a rule that if the consumer leaves all the items at the station 110 temporarily suspend the transaction when the consumer is detected in the images as heading towards a service desk; 5) a rule that is a personal item of the consumer, such as a purse is left behind and the consumer is headed towards an exit raise alerts to personnel and to capture the attention of the consumer to return for the purse.

In fact, the current state of the transaction as provided by the transaction manager 121 during the transaction and the existing context as currently resolved by the contextual manager 130 for the items can be associated with rules that determine what action, if any, the contextual manager 130 processes or instructs the transaction manager 121 to take.

The contextual manager 130 can also be processed to provide context to handle practically difficult low weight items placed on the bag scale. As sated before, each item has an average weight that is recalculated each time an item is purchased and weighed. If a consumer were to scan a low weight item having a low average weight, but then either intentionally or unintentionally places multiple ones of the items in a bag on the bag scale 123, the combined total weight of the multiple items may be within a configured tolerance, such that no alert is raised (although the contextual manager 130 would capture this detail and alert the transaction manager 121 or raise a secure alert base on the video analytics for the transaction as a whole (item count mismatch)). The transaction manager 121 reports the combined weight for the multiple items as a new weight to record to the WLDB 160 when calculating the running weight average for the item. This means that the next consumer that transacts with the same item is going to trigger an assistance intervention by the transaction manager 121 because the average item weight was increased by the multiple items (identified as one item by the previous consumer). This is a particularly problematic situation for subsequent consumers buying the same item and means that a false positive intervention alert will likely be raised for each of the subsequent consumers buying the same item.

Here, the contextual manager 130 can force the transaction manager 121 to override the false positive. However, as the subsequent items are weighed, their recorded weights can be added back to the WLDB 160, such that the average weight for the item self-corrects over time as more and more of those items are purchased. Furthermore, the WLDB 160 can be instructed to relearn and start over with calculating the average weight for the item, so that the self-correction happens more rapidly and sooner than waiting on the average to be decreased over time as more and more of the same items are purchased by consumers.

The contextual manager 130 resolves a context of a transaction by tracking item movements within the SST station 110 as soon as a consumer approaches the SST station 110 and, in some cases, before a transaction is initiated by the consumer on the SST120. The context defines item locations, bags in use and their locations, cart in sue and its location, known locations for the produce scale 122 and the bag scale 123, known shelving locations for the SST station 110, consumer-possessed items that are detectable for the images (such as purse or personal bags) and their locations, and individuals present with the consumer at the SST station 110. The contextual manager 130 also provides video analytics for the items (such as total number of detected items, direction of movement of the consumer away from the SST station 110, etc.). The context and the video analytics are used during and after the transaction to override false positives requiring attendant intervention and to identify security situations or situations that are not security related but require attention.

A rules-based approach allows the actions of the contextual manager 130 to be user-defined based on context and the video analytics and in view of current transaction state provided by the transaction manager 121.

By supplementing a transaction with the physical context of the SST station 110 before, during, and after a transaction, false attendant interventions alerts can be substantially reduced and more intelligent security decisions can be made. Additionally, low weight items can be handled while resolving the average expected weights of such items in a more dynamic and real-time fashion.

In an embodiment, the context defines an association of each item: to the consumer, to someone with the consumer, a bag, a shelf, a personal bag of the consumer, and a cart.

Furthermore, the context defines associations of each bag, when present to: a consumer, someone with the consumer, a shelf, a personal bag of the consumer, and a cart. The associations may be viewed as the location of the items, the bags, and the cart relative to a SST station shelf, the consumer, or someone with the consumer.

In an embodiment, the contextual manager 130 includes a trained machine learning algorithm that tracks the items, carts, bags, consumer, and individuals with the consumer from images provided by the contextual manager 130. The input is an image taken at the SST station 110 and the output is a current context for the transaction being processed at the SST station 110.

In an embodiment, the SST station 110 is configured as a cashier-assisted checkout station where a cashier is checkout out a consumer with the SST 120 operated in a cashier-assisted mode of operation.

In an embodiment, the SST station 110 is configured for self-checkouts where the consumer is self-checking out with items.

These and other embodiments will now be discussed with reference to the FIGS. 2-4.

Figure 2:
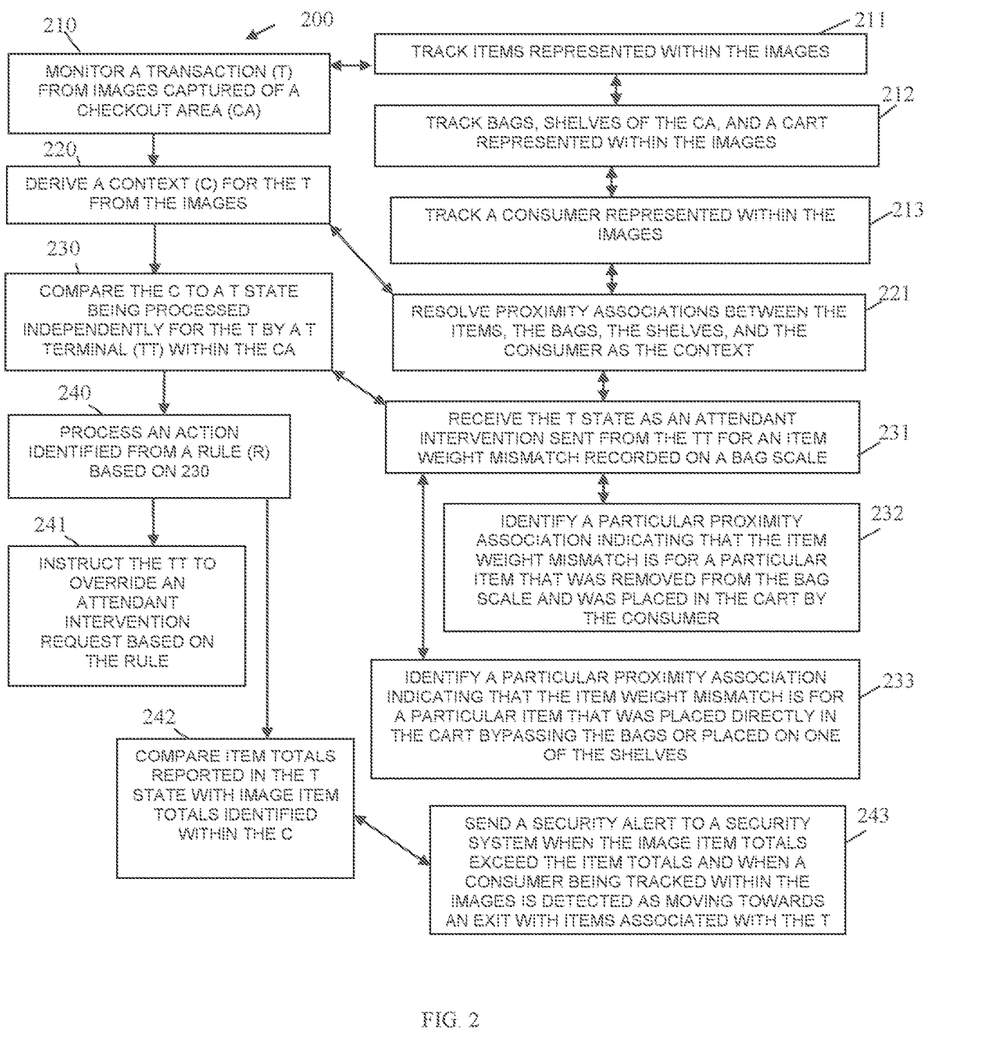
FIG. 2 is a diagram of a method for contextual self-checkout based verification, according to an example embodiment.

FIG. 2 is a diagram of a method 200 for contextual self-checkout based verification, according to an example embodiment. The software module(s) that implements the method 200 is referred to as a "transaction contextual manager." The transaction contextual manager is implemented as executable instructions programmed and residing within memory and/or a non-transitory computer-readable (processor-readable) storage medium and executed by one or more processors of a device. The processor(s) of the device that executes the transaction contextual manager are specifically configured and programmed to process the transaction contextual manager. The transaction contextual manager may have access to one or more network connections during its processing. The network connections can be wired, wireless, or a combination of wired and wireless.

In an embodiment, the device that executes the transaction contextual manager is a server In an embodiment, the device that executes the transaction contextual manager is the SST 120. In an embodiment, the SST 120 is executed in a consumer-self checkout mode of operation. In an embodiment, the SST 120 is operated in a cashier-assisted mode of operation.

In an embodiment, the transaction contextual manager some or all of: the contextual manager 130 and/or the transaction manager 121.

At 210, the transaction contextual manager monitors a transaction from images of a checkout area. The images can be captured from a plurality of cameras 140 situated overhead and around the checkout area. The checkout area includes a SST.

According to an embodiment, at 211, the transaction contextual manager tracks items represented in the images. The identity of particular items do not have to be identified; rather, the transaction contextual manager can label unique items separately. In this manner, the transaction manager 121 does not have to provide any item identifiers and the transaction contextual manager does not have to identify an item code from the images.

In an embodiment of 211 and at 212, the transaction contextual manager tracks bags, shelves of the checkout area, and any cart (if present) within the images. The shelves can be used as a reference point in the images, since their locations are known or predefined.

In an embodiment of 212 and at 213, the transaction contextual manager tracks a consumer represented within the images. Again, the identity of the consumer does not have to be known and attributes associated with people can be determined from the images and used for tracking the consumer from image to image (frame to frame).

At 220, the transaction contextual manager derives a context for the transaction from the images. The context was discussed above with the FIG. 1.

In an embodiment of 213 and 220, at 221, the transaction contextual manager resolves proximity associations between the items, the bags, the shelves, the cart, and the consumer. A proximity association infers a relationship (based on computed distances or overlapping locations within the image) that the item has with the bags, shelves, cart, and the consumer.

At 230, the transaction contextual manager compares the context to a transaction state associated with a transaction that is being processed on the transaction terminal within the checkout area. The transaction is being independently processed by the transaction terminal. That is, the progression of the processing of the transaction on the transaction terminal is not determined by the processing being performed by the transaction contextual manager. The transaction is independently being followed by the transaction contextual manager.

In an embodiment of 221 and 230, at 231, the transaction contextual manager receives the transaction state as an attendant intervention interrupt generated by the transaction manager that executes on the transaction terminal for an item weight mismatch recorded on a bag scale.

In an embodiment of 231 and at 232, the transaction contextual manager identifies a particular proximity association indicating that the item weight mismatch if for a particular item that was removed from the bag scale and was placed in the cart by the consumer.

In an embodiment of 231 and at 233, the transaction contextual manager identifies a particular proximity association indicating that the item weight mismatch is for a particular item that was placed directly in the cart bypassing the bags or placed directly on one of the shelves bypassing the bags of the bag scale.

At 240, the transaction contextual manager processes an action identified from a rule based on 230. That is, user-defined rules can be identified for any given context detected and the rules determine an automated action that the transaction contextual manager processes.

In an embodiment, at 241, the transaction contextual manager instructs the transaction terminal to override an attendant intervention interrupt request based on the rule.

In an embodiment, at 242, the transaction contextual manager compares item totals reported by the transaction terminal with image item totals identified within the context. That is, video or image analytics are derived from the context and include image item totals.

In an embodiment of 242 and at 243, the transaction contextual manager sends a security alert to a security system when the image item totals exceed the item totals and when the consumer is tracked within the images as moving towards an exit with the items associated with the transaction. This may be an indication of theft or may be an honest mistake of the consumer, but the transaction contextual manager processes a rule associated with the context and the analytics to send an alert to the security system.

Figure 3:
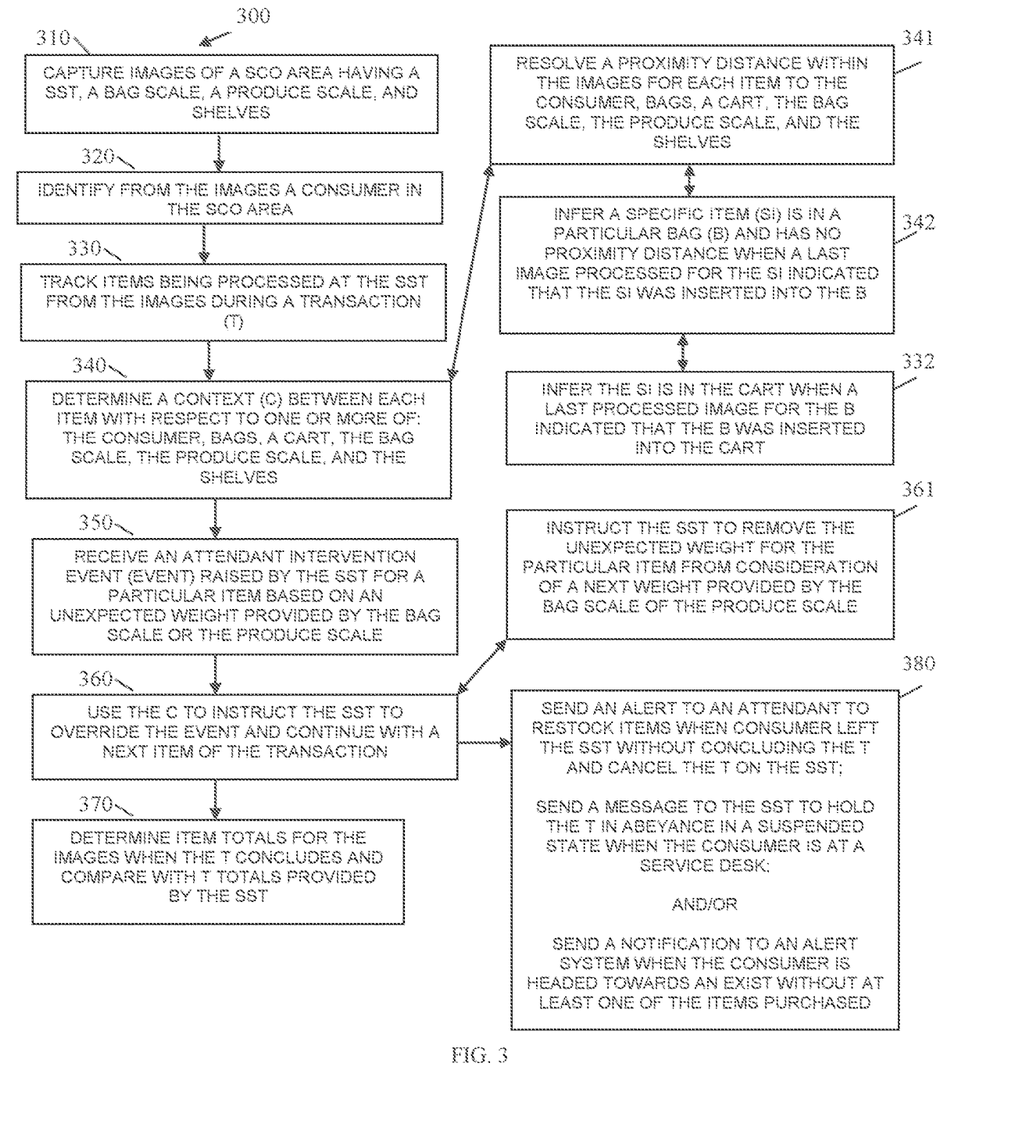
FIG. 3 is a diagram of another method for contextual self-checkout based verification, according to an example embodiment.

FIG. 3 is a diagram of another method 300 for contextual self-checkout based verification, according to an example embodiment. The software module(s) that implements the method 300 is referred to as a "transaction context resolver." The transaction context resolver is implemented as executable instructions programmed and residing within memory and/or a non-transitory computer-readable (processor-readable) storage medium and executed by one or more processors of a device. The processors that execute the transaction context resolver are specifically configured and programmed to process the transaction context resolver. The transaction context resolver may have access to one or more network connections during its processing. The network connections can be wired, wireless, or a combination of wired and wireless.

In an embodiment, the device that executes the transaction context resolver is a server or a cloud processing environment.

In an embodiment, the device that executes the transaction context resolver is the SST 120. In an embodiment, the SST 120 is operated in a consumer self-checkout mode of operation by a consumer performing a self-checkout transaction. In an embodiment, the SST 120 is operated in a cashier-assisted mode of operation by a cashier assisting a consumer with a checkout transaction.

In an embodiment, the transaction context resolver is all or some combination of: the transaction manager 121, the contextual manager 130, and/or the method 200.

At 310, the transaction context resolver captures images of a self-checkout (SCO) area having a SST, a bag scale, a produce scale, and shelves or countertops for resting items or bags.

At 320, the transaction context resolver identifies from the images a consumer in the SCO area. This identification can occur before any actual transaction is initiated on the SST by the consumer, such that tracking can begin before the transaction actually is initiated.

At 330, the transaction context resolver tracks items being processed at the SST from the images during a transaction. As stated before, this tracking may have begun at 320 once the consumer initiates the transaction at 330, the transaction context resolver actively tracks specific items being processed from the loading area shelves, the cart, or a consumer bag with the transaction terminal.

At 340, the transaction context resolver determines a context between each item with respect to one or more of: the consumer, a cart (if present), the bag scale, bags, the produce scale, and the shelves (countertops).

In an embodiment, at 341, the transaction context resolver resolves a proximity distance within the images for each item to the consumer, the bags, the cart, the bag scale, the produce scale, and the shelves (countertops). Again, this proximity distance is an inferred relationship that any given item has with the above-stated items, which implies a location that the item is currently at in any given image frame.

In an embodiment of 341 and at 342, the transaction context resolver infers a specific item is in a particular bag and has no proximity distance when a last image processed for the specific item indicated that the specific item was inserted into the particular bag.

In an embodiment of 342 and at 343, the transaction context resolver infers the specific item is in the cart when a last processed image for the particular bag indicated that he bag was inserted into the cart.

At 350, the transaction context resolver receives an attendant intervention event (interrupt) raised by the SST for a particular item based on an unexpected weight provided by the bag scale or the produce scale.

At 360, the transaction context resolver uses the context to instruct the SST to override or ignore the event and continue with processing a next item of the transaction (assuming there is a next item and the particular item was not the last item of the transaction).

In an embodiment, at 361, the transaction context resolver instructs the SST to remove the unexpected weight for the particular item from consideration of a next weight provided by the bag scale or the produce scale. In this embodiment, the transaction manager 121 is dynamically adjusted to remove the unexpected weight from any next item that is being weighed.

In an embodiment, at 370, the transaction context resolver determines item totals for the images when the transaction concludes and the transaction context resolver then compares the item totals calculated with transaction totals provided by the SST.

In an embodiment, at 380, the transaction context resolver performs a variety of additional processing including one or more of: sending an alert to an attendant to restock items left at the SST when the consumer left the SST without taking the items of concluding the transaction (here the transaction is cleared or canceled from the SST); sending a message to the SST to hold the transaction in abeyance in a suspended state when the consumer is detected at or heading in the direction of a service desk with the items remaining at the SST; and/or send a notification to an alert system when the consumer is headed towards an exit without having at least one of the items that were purchased and paid for by the consumer.

Figure 4:
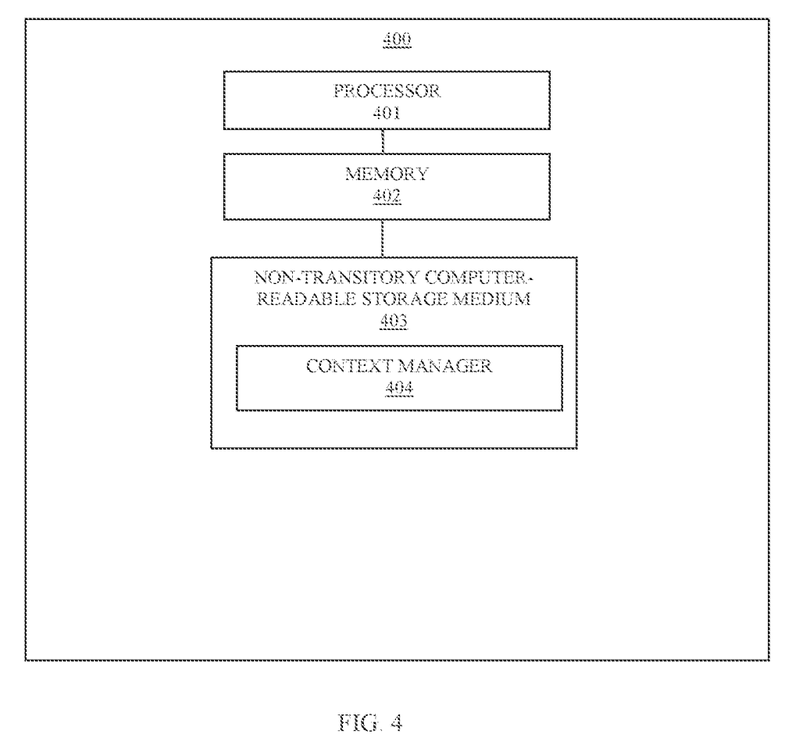
FIG. 4 is a diagram of terminal having contextual self-checkout based verification, according to an example embodiment.

FIG. 4 is a diagram of a system 400 for contextual self-checkout based verification, according to an example embodiment. The system 400 includes a variety of hardware components and software components. The software components of the system 400 are programmed and reside within memory and/or a non-transitory computer-readable medium and execute on one or more processors of the system 400. The system 400 may communicate over one or more networks, which can be wired, wireless, or a combination of wired and wireless.

In an embodiment, the system 400 implements, inter alia, the processing described above with respect to all of or some combination of: the system 100, the method 200, and/or the method 300.

The system 400 includes at least one processor 401, memory 402, and non-transitory computer-readable storage media 403. The non-transitory computer-readable storage media includes executable instructions representing a context manager 404.

The executable instructions when executed from the non-transitory computer-readable storage medium 403 cause the processor 402 to perform the processing of the context manager 404.

The context manager 405 is configured to: independently monitor a transaction area through images taken of the transaction area independent of a transaction terminal that processes a transaction; clear attendant intervention alerts when a context from the images and a transaction state at a transaction terminal of the transaction area indicates the attendant intervention alerts are unnecessary; maintain analytics for items processed during a transaction; compare the analytics to transaction totals when the transaction concludes; and process custom-defined actions based on rules associated with the context and the analytics.

In an embodiment, the context manager 405 is all or some combination of: the contextual manager 130, the method 200, and/or the method 300.

In an embodiment the transaction area is the SST station 110. In an embodiment, the context manager 405 interacts with the transaction manager 121 that executes on the SST 120.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   providing executable instructions to a processor of a server causing the processor to execute the executable instructions and perform operations comprising:
   monitoring a transaction from images captured of a checkout area;
   maintaining a context for items of the transaction during the transaction with respect to bags, shelves of the checkout area, a cart, and a produce scale of a terminal from the monitoring of the images images, wherein maintaining further includes maintaining the context as item locations for the items within the checkout area, bag locations for the bags within the checkout area, cart location for the cart within the checkout area, produce scale location for the produce scale within the checkout area, bag scale location for a bag scale within the checkout area, shelf locations for the shelves within the checkout area, consumer-possessed items associated with a consumer and detectable within the checkout area, and any individuals present with the consumer in the checkout area, wherein maintaining further includes maintaining analytics with the context, wherein the analytics include a total number of items detected and direction of movement of the consumer away from the terminal;

comparing the context to a transaction state being processed independently for the transaction at the terminal within the checkout area; and processing an action identified from a rule based on the comparing of the context to the transaction state.

2. The method of claim 1, wherein monitoring further includes tracking each of the items represented within the images.

3. The method of claim 2, wherein tracking further includes tracking the bags, the shelves of the checkout area, and the cart represented within the images with respect to the items.

4. The method of claim 3, wherein tracking further includes tracking the consumer represented within the images with respect to the items, the bags, the shelves of the checkout area, and the cart.

5. The method of claim 4, wherein maintaining further includes resolving proximity associations between the items, the bags, the shelves, the cart, and the consumer within the context.

6. The method of claim 5, wherein comparing further includes receiving the transaction state as an attendant intervention sent from the terminal for an item weight mismatch recorded on the bag scale.

7. The method of claim 6, wherein receiving further includes identifying a particular proximity association indicating that the item weight mismatch is for a particular item that was removed from the bag scale and was placed in the cart.

8. The method of claim 6, wherein receiving further includes identifying a particular proximity association indicating that the item weight mismatch is for a particular item that was placed directly in the cart bypassing the bags or placed on one of the shelves.

9. The method of claim 1, wherein processing further includes instructing the terminal to override an attendant intervention request based on the rule.

10. The method of claim 1 further comprising, comparing item totals reported in the transaction state with image item totals identified in the context.

11. The method of claim 10 further comprising sending a security alert to a security system when the image item totals exceed the item totals when the consumer being tracked within the images is detected as moving towards an exit with the items associated with the transaction.

12. A method, comprising:
providing executable instructions to a processor of a server causing the processor to execute the executable instructions and perform operations comprising:
capturing images of a Self-Checkout (SCO) area having a Self-Service Terminal (SST), a bag scale, a produce scale, and shelves;
identifying from the images a consumer in the SCO area;
tracking items being processed at the SST from the images during a transaction;
maintaining a context from the images between each item with respect to: the consumer, bags of the consumer, a cart of the consumer, the bag scale, the produce scale, and the shelves, wherein maintaining further includes maintaining the context as item locations for the items within the SCO area, bag locations for bags within the SCO area, cart location for a cart within the SCO area, produce scale location for the produce scale within the SCO area, bag scale location for the bag scale within the SCO area, shelf locations for the shelves within the SCO area, consumer-possessed items detectable within the SCO area, and any individuals present with the consumer in the SCO area, wherein maintaining further includes maintaining analytics with the context, wherein the analytics include a total number of items detected and direction of movement of the consumer away from the terminal;
receiving an attendant intervention event raised by the SST for a particular item based on an unexpected weight provided by the bag scale or the produce scale; and
using the context to instruct the SST to override the attendant intervention event and continue with a next item of the transaction.

13. The method of claim 12, wherein maintaining further includes resolving a proximity distance within the images for each item to the consumer, the bags, the cart, the bag scale, the produce scale, and the shelves.

14. The method of claim 13, wherein maintaining further includes inferring a specific item is in a particular bag and has no proximity distance to the particular bag when a last image processed for the specific item indicated that the specific item was inserted into the particular bag.

15. The method of claim 14, wherein inferring further includes inferring the specific item is in the cart when a last processed image for the particular bag indicated that the particular bag was inserted into the cart.

16. The method of claim 12, wherein using further includes instructing the SST to remove the unexpected weight for the particular item from consideration of a next weight provided by the bag scale or the produce scale.

17. The method of claim 12 further comprising, determining the total number of items from the images and an item total processed by the SST when the transaction concludes.

18. The method of claim 12 further comprising one or more of:
sending an alert to an attendant to restock the items when the images indicate the consumer left the SST without paying for the items or concluding the transaction and canceling the transaction;
sending a message to the SST to hold the transaction in abeyance in a suspended state when the images indicate the consumer left the SST and is at a service desk; and
sending a notification to an alert system when the images indicate the consumer is headed towards an exit without at least one of the items purchased with the transaction.

19. A system, comprising:
a processor;
a memory;
a non-transitory computer-readable storage medium having executable instructions;
the executable instructions when provided to the processor from the non-transitory computer-readable storage medium into the memory cause the processor to perform operations comprising:
independently monitoring a transaction area through images taken of the transaction area independent of a transaction terminal that processes a transaction, wherein the independently monitoring further includes monitoring a consumer identified in the images performing the transaction at the transaction terminal with respect to a bag scale of the transaction terminal, a cart of the consumer, one or more bags of the consumer, a produce scale, and shelves identified in the transaction area through the images, wherein independently monitoring further includes maintaining a context for the transaction as item locations for the items within the transaction area, bag locations for the bags within the transaction area, cart location for the cart within the transaction area, produce scale location for the produce scale within the transaction area, bag scale location for the bag scale within the transaction area, shelf locations for the shelves within the transaction area, consumer-possessed items detectable within the transaction area, and any individuals present with the consumer in the checkout area, wherein maintaining further includes maintaining analytics with the context, wherein the analytics include a total number of items detected and direction of movement of the consumer away from the transaction terminal;

clearing attendant intervention alerts when the context from the images and a transaction state at a transaction terminal of the transaction area indicates the attendant intervention alerts are unnecessary;

maintaining additional analytics for items processed during a transaction by the transaction terminal;

comparing the additional analytics, the context, and the analytics for the context to transaction totals when the transaction concludes; and processing custom-defined actions based on rules associated with the context, the analytics, the additional analytics, and the transaction totals.

20. The system of claim 19, the transaction terminal is: a Self-Service Terminal (SST) operated in a self-checkout mode of operation or operated in a cashier-assisted mode of operation.

\* \* \* \* \*